United States Patent
Larson

[11] Patent Number: 5,933,360
[45] Date of Patent: Aug. 3, 1999

[54] METHOD AND APPARATUS FOR SIGNAL COMPRESSION AND PROCESSING USING LOGARITHMIC DIFFERENTIAL COMPRESSION

[75] Inventor: Keith E. Larson, Sugarland, Tex.

[73] Assignee: Texas Instruments Incorporated, Dallas, Tex.

[21] Appl. No.: 08/715,534

[22] Filed: Sep. 18, 1996

[51] Int. Cl.[6] .................................................. G06F 7/38
[52] U.S. Cl. .................................. 364/748.18; 364/748.5
[58] Field of Search ........................... 364/748.18, 748.5, 364/602, 825

[56] References Cited

U.S. PATENT DOCUMENTS

| | | | |
|---|---|---|---|
| 4,583,180 | 4/1986 | Kmetz | 364/715 |
| 4,720,809 | 1/1988 | Taylor | 364/748 |
| 5,365,465 | 11/1994 | Larson | 364/715.03 |

*Primary Examiner*—Tan V. Mai
*Attorney, Agent, or Firm*—Gerald E. Laws; Robert D. Marshall, Jr.; Richard L. Donaldson

[57] ABSTRACT

For most 'natural' signals like audio and video, the first derivative with respect to time (or spatially as in video) can have a significant amount of error and still be perceived as accurate due to the masking properties of the ears and eyes. A Logarithmic Differential Compression (LDC) data stream representation of the first derivative is formed with four or less bits of mantissa and can be treated as both a logarithmic numeric representation and a floating point numeric representation without correction. A digital signal processor 524 is described which performs multiplication of LDC data with a simple scalar adder 600 and addition of LDC data with a simple four or less bit floating point adder 610. A digital signal processor is optimized to process LDC data and low cost arrays of these digital signal processors are formed to provide high performance systems for transforms and filtering.

22 Claims, 5 Drawing Sheets

METHOD AND APPARATUS FOR SIGNAL COMPRESSION AND PROCESSING USING LOGARITHMIC DIFFERENTIAL COMPRESSION

TECHNICAL FIELD OF THE INVENTION

This invention relates generally to the field of electronic data processing devices, and more particularly, to floating point arithmetic computing units.

BACKGROUND OF THE INVENTION

Arithmetic logic units (ALUs) are electronic components that are used to perform specific arithmetic and logic functions. In general, an ALU is considered a part of the central processing unit (CPU) of a general purpose computer or of a microprocessor. Recently, computer designers and manufacturers have begun utilizing ALUs that are incorporated in digital signal processors (DSPs) to meet the demands of special applications, such as pattern recognition, digital image enhancement, radar processing, speech filtering, etc. The architecture of DSPs is particularly well-suited for computing-intensive applications that require frequent high-speed arithmetic operations. More specifically, DSPs are high-speed reduced-instruction-set devices which are capable of carrying out limited tasks such as addition, subtraction, multiplication, and shifting operations faster than general purpose processors. A typical DSP includes a micro-instruction sequencer, read-only-memory (ROM), random-access-memory (RAM), a high-speed ALU, a parallel multiplier, and related storage registers. The DSP controls the operation of the ALU through the micro-instruction sequencer.

Most modern pipelined ALUs are capable of performing standard arithmetic operations (e.g., addition and subtraction,) in a singe computing cycle. Many can also perform multiplication and floating point arithmetic operations in a single clock cycle, with the aid of complex architectures and logic circuits. A floating point (FP) format allows numbers to be represented in a large dynamic range and with high precision, which are critical for many applications. Due to the complexity required to provide high performance floating point calculations, the computing algorithms are often cumbersome and complex because the necessary floating point arithmetic functions must be derived from a lengthy sequence of floating point or non-floating point computations which are supported by a less complex processor.

The application of the logarithm number (LN) format to perform arithmetic functions is well known in the art. The FP is analogous to the LN. To illustrate, in a digital computer with a 32 bit/word binary format, an FP includes the sign bit and two other parts: the first or exponent part typically uses eight (8) bits and represents the power to which one raises the number two in order to get the approximate number. The dynamic range of numbers that can be represented thus extends from zero all the way through the number two raised to the 128th power. This first exponent part is then multiplied by a second or mantissa part, which typically has twenty-three (23) bits in order to fully define the number. The mantissa is normalized so that it always lies within a limited range of values with the highest value being twice the lowest value, in keeping with the doubling of the number upon each increment of the exponent part.

Similarly, in the LN of the same number, the logarithm exponent is divided into a portion to the left of the decimal point that comprises whole or integer numbers called the characteristic, and a portion to the right of the decimal point called the fraction. It is known in the art that, in a LN of base two, the characteristic is the same as the FP exponent, and the fraction is nearly the same as the FP mantissa, assuming that certain normalization ranges are used. In short, the major difference between the FP and the corresponding LN of the same number is that the FP uses only integer exponents and spans the numbers in between with a linear fractional multiplier; whereas the LN utilizes a continuous spectrum of exponents, consisting of a characteristic part and a fractional part, to represent the number. Thus, the LN exponent need not be multiplied by a fractional quantity in order to fully define the number.

The similarity between the FP and the LN has made it common for FP algorithms to use the exponent and mantissa of FPs as rough guesses for the corresponding characteristic and fraction of LNs. U.S. Pat No. 4,583,180, issued to Kmetz, discloses a digital transformation system for converting between FP and LN of the same number by normalizing the FP in the range of one to two, and adapting one function as the other function, after a correction, wherein the correction is generated by a ROM using the one function as an address. However, because the transformation taught by Kmetz apparently only approximates arithmetic operations, the results are not as accurate as full floating point arithmetic operations. For the purpose of the Kmetz method, apparently accuracy is not essential because such transformation is used for speech recognition signal analysis in which the results of many multiplications are averaged together so that accuracy is not contingent upon any one multiplication.

U.S. Pat. No. 4,720,809, issued to Taylor, discloses a hybrid FP/LN arithmetic processor. The patent discloses a hybrid arithmetic processor which combines attributes of conventional FP arithmetic with LN arithmetic. The arithmetic processor includes an input section for converting FP input operands to LN intermediate operands. A computing section performs arithmetic operations on the LN intermediate operands. An output section converts the LN intermediate output of the computing section to FP.

Taylor further discloses full look-up tables for converting from FP to LN. The look-up tables, as implemented in ROM, apparently require that the number of address lines be equal to the bit width of the input FP mantissa and the word length be equal to the bit width of the corresponding LN fraction. The Taylor method apparently requires a full mapping technique for converting from FP to LN. The full mapping technique requires a high utilization of ROM resources and is difficult to implement for a floating point format of 32-bit, width, e.g., the IEEE floating point format.

U.S. Pat. No. 5,365,465, issued to Larson and incorporated herein by reference, discloses an improved method of converting from FP to LN using interpolation. However, even with this improved method, a significant amount of processing resources are required to accomplish the conversion.

SUMMARY OF THE INVENTION

A logarithmic number is roughly an approximation of a floating point number, with the exponent being exactly equal to the characteristic portion of the logarithmic number and the mantissa being approximately equal to the fractional portion to an accuracy of approximately four binary bits. The present invention compresses a signal, such as an audio or video signal, by taking the first derivative of the signal and processes the compressed signal by treating the floating point representation as being equal to the logarithmic representation. This allows data filtering, which generally involves multiplication and addition, to be performed by simply performing a scalar addition or subtraction of data samples to perform logarithmic multiplication or division and by performing floating point addition or subtraction of data samples without needing any conversion between data formats. Inaccuracies which occur in the processed signal after it is decompressed are not perceptible to the ear or eyes.

An aspect of the present invention is a method of processing comprising the steps of converting a signal to a numerical representation in floating point format, using the numerical representation as a floating point operand to perform floating point addition operations, and treating the numerical representations as a logarithm and using the numerical representation as a logarithmic operand to perform logarithmic multiplication operations by scalar addition.

Another aspect of the present invention is a digital processing circuit comprising circuitry for sampling an analog input signal to form a sequence of logarithmic digital samples in a floating point representation, a scalar adder for logarithmic multiplication of the logarithmic digital samples, a floating point adder for adding the logarithmic digital samples, and circuitry for forming an output signal connected to the scalar adder and the floating point adder.

BRIEF DESCRIPTION OF THE DRAWINGS

The above-noted and other aspects of the present invention will become more apparent from a description of the preferred embodiment when read in conjunction with the accompanying drawings.

The drawings illustrate the preferred embodiment of the invention. In the drawing, the same members have the same reference numerals.

Corresponding numerals and symbols in the different figures and tables refer to corresponding parts unless otherwise indicated.

DETAILED DESCRIPTION OF THE INVENTION

The inventor is apparently the first to recognize the advantage of the first derivative nature of signals when the signals are expressed as analog, floating point or logarithms. The concept of a Logarithmic Differential Compression (LDC) format basically consists of the realization that by taking the first derivative of a signal, the effect of truncating digital samples of the differential signal when the samples are expressed in either a floating point or logarithmic format are minimized. Furthermore, the differential signals can be manipulated in either a digital, an analog, or a hybrid circuit.

As discussed in the following pages, LDC takes advantage of properties of real world signals and the benefits of the present invention are applicable to methods of signal and data compression, to methods of signal processing, and to methods of physical implementation. For a floating point (or logarithmic) format the overall accuracy of the mantissa is selected to be from zero to any number of bits depending on an application's sensitivity to error.

Sensory inputs such as sight and hearing employ automatic gain control, effectively making it possible to cover wide dynamic ranges while still being able to maintain sensitivity to dynamic signals. An example would be the use of a logarithmic code in telephony. However, this technique alone does not adequately exploit the dynamic characteristics of the human sensory input. A block floating point technique has been used by some algorithms and hardware in the past but it still fails to fully exploit the full capabilities contained in a natural process.

Figure 1:
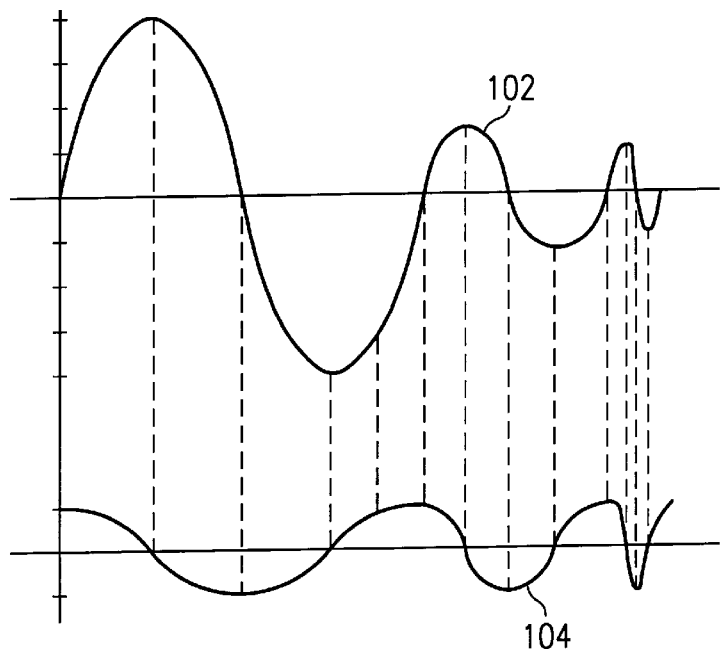
FIGS. 1A–B illustrate a typical signal and the first derivative of such a typical signal.

For example, consider a typical audio signal, as illustrated in FIG. 1A In audio signals, the power spectra is heavily dominated by the lowest frequencies. Furthermore, information contained in the highest frequencies is relatively insensitive to noise and aliasing due to masking and dynamic effects in the ear. For these reasons signal to noise ratios are less important at higher frequencies. Finally, by closely analyzing a typical signal we find that the slew rate is relatively constant over the entire audio band.

Figure 2A:
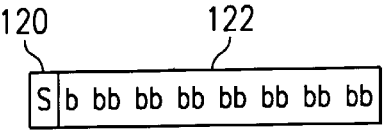
FIGS. 2A–2C illustrate a format for a numeric representation according to the present invention.

Since slew rate is nothing more than the first derivative of a signal, as illustrated in FIG. 1B, and in the digital domain this can be represented as $Z[n]=x[n]-x[n-1]$, the calculation is trivial. If the derivative is expressed in a floating point format, the dynamic range may be compressed into four exponent bits. Finally, the ears' ability to mask high frequency noise allows the mantissa to also be dramatically shortened to as few as 1 or 2 bits, and still maintain high quality. The result is that high quality audio can be packed into a Logarithmic Differential Compression (LDC) number format as shown in FIG. 2B or 2C.

Figure 2B:
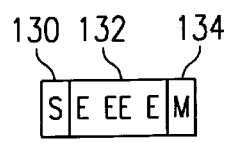
Figure 2C:
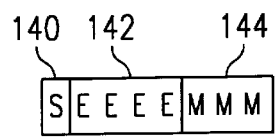

FIG. 2B illustrates an LDC format which has a sign bit, four exponent bits and one mantissa bit, for a total of six bits per digital sample. FIG. 2C illustrates an LDC format which has a sign bit, four exponent bits, and three mantissa bits, for a total of eight bits per digital sample. As will be discussed later, according to the present invention, the length of the mantissa field and the exponent field can be advantageously selected for a specific application, and hardware can be optimized based on the size of the LDC format. Converting an analog signal to digital representation by sampling is well known in the art and often uses a 16 bit binary scalar format as illustrated in FIG. 2A. Comparing the formats of FIGS. 2B or 2C to FIG. 2A illustrates an advantage of the present invention in which a compression factor of at least 2× is obtained with only a minor degradation in the quality of an audio signal, and this degradation is typically filtered out by the human auditory perception system.

Decompression simply requires an integration of the processed and/or filtered LDC stream. However, in practice the LDC data stream which is created contains no DC information. Since the ear does not respond to DC, a simple DC restoration loop with a very long time constant can be used with excellent results. In practice another method can be used to transmit the DC information at a low rate along with the LDC data.

An aspect of the present invention is the profound discovery that since this is a linear, continuous in time compression algorithm performed on a sample by sample basis the compressed signal can be filtered while compressed since only the first derivative has been taken. For example FIR and IIR filters, FFT's and other signal manipulation algorithms can be applied directly to the LDC data stream. This means that the hardware and/or software used for filtering the compressed signal can be minimized in many ways, as will be described with reference to FIGS. 5–8.

Another aspect of the present invention is that by compressing the data stream using a floating point form in which the mantissa can be less than approximately four bits, the same exact number representation for each data sample can be treated as both a logarithm and a floating point representation of that data sample. This allows data filtering, which generally involves multiplication and addition, to be performed by simply performing a scalar addition or subtraction of data samples to perform logarithmic multiplication or division and by performing floating point addition or subtraction of data samples without needing any conversion between data formats. This also allows a significant reduction in the complexity of hardware and/or software used for filtering the compressed signal.

Figure 3A:
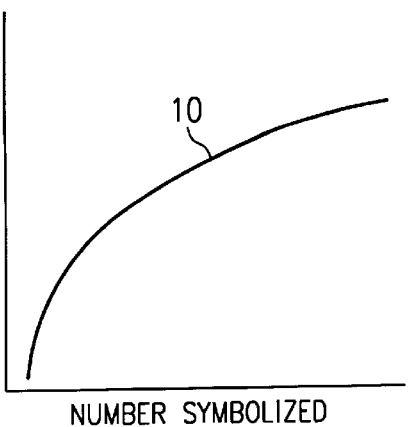
FIGS. 3A–3B and 4 illustrate the relationship between FP and LN, specifically, between the FP mantissa and LN.
Figure 3B:
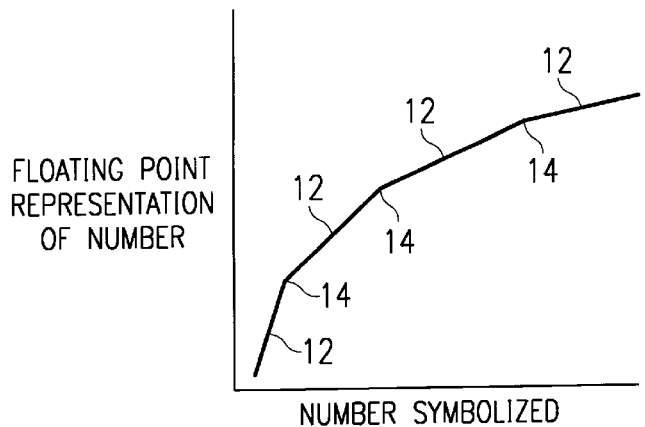
Figure 4:
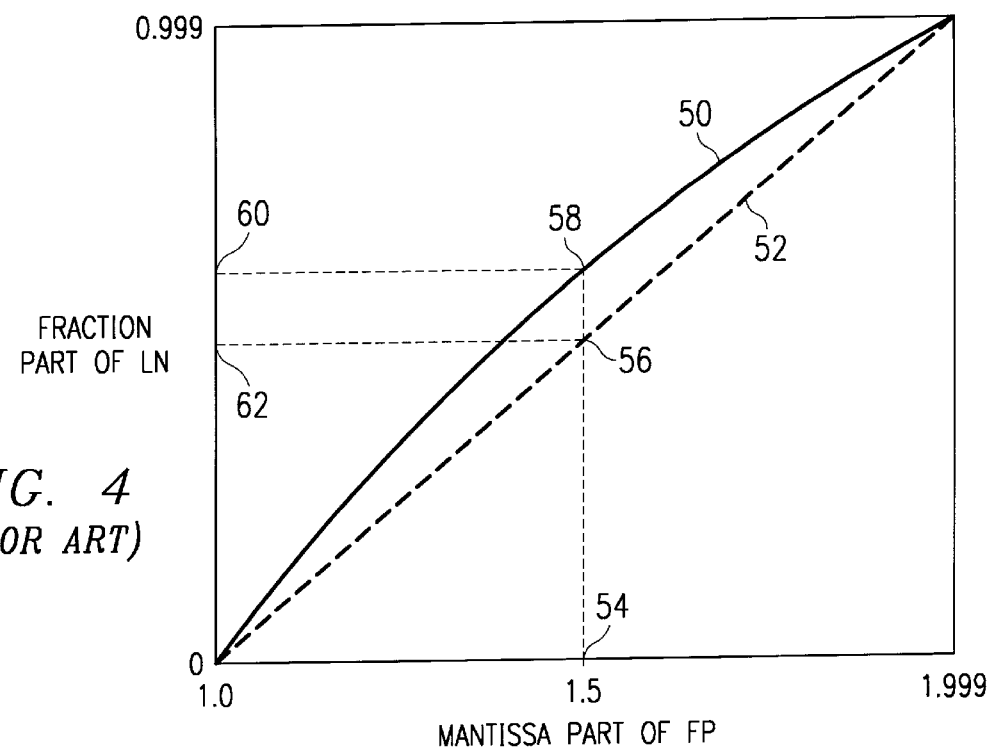

In order to better understand how the same data value can be treated as both a floating point representation of a number and also as a logarithmic representation of the same number, refer to FIGS. 3A–3B and 4. FIG. 3A illustrates that as a number increases, its corresponding logarithmic value increases along a smooth curve 10, although at a progressively lesser rate of increase. A floating point representation does nearly the same thing, as shown in FIG. 3A, except that a series of straight line segments 12 make up the curve due to the fact that floating points systems represent the numbers between the exponents with a linear fraction multiplier. Since the preferred embodiment is based on the binary number system, it is advantageous to use logarithms to the base two. If this is done, each of the vertices 14 in FIG. 3B will lie on curve 10 if the graphs are superimposed.

FIG. 4 shows a typical segment in the optimum range of normalizations with the straight floating point segment 52 shown as a dashed line and the logarithmic segment 50 shown as a solid line. The floating point normalization is chosen to run from one to two and the logarithm normalization range from zero to one. This is advantageous in simplifying the circuitry because the logarithm to the base two of one is zero and the logarithm to the base two of two is one. So with these particular ranges, as the fraction goes from one to two, the logarithm goes from zero to one. It becomes very simple, therefore, to simply subtract one from a mantissa 54 and produce a fractional number that is nearly the same as a fractional part of a logarithm 60.

FIG. 4 depicts a close correlation between the mantissa of a FP and the corresponding LN fraction. Note that while FIG. 4 is denominated in decimal, microprocessor based computing will generally be done in binary. In FIG. 4, the x-axis is the normalized range of the mantissa bounded between 1.0 and 1.999. They y-axis is the logarithmic fraction bounded between 0.0 and 0.999. Curve line 50 is the exact LN function which maps the FP mantissa to the corresponding LN fraction. Dashed line 52 illustrates that the FP mantissa, as it increases from 1.0 to 1.999, relates closely to its corresponding LN fraction. In floating point representation it is common to delete the leading one, which makes the FP mantissa even more like the LN fractional part. It is observed that given a mantissa, line 52 approximately maps the exact corresponding fraction.

Another approach for illustrating the relationship between the floating point (FP) representation of a number and the corresponding logarithmic (LN) representation is by observing the following equations:

$$\text{FP number} = \text{mantissa} * 2^{exponent} \quad (1)$$

$$\text{exponent} = \log^2(\text{FP}/\text{mantissa}) \quad (2)$$

$$\text{exponent} = \log^2(\text{FP}) - \log2(\text{mantissa}) \quad (3)$$

$$\log2(\text{FP number}) = \text{exponent} + \log2(\text{mantissa}) \quad (4)$$

In equation (1), a number is represented in FP as the value of the FP mantissa of that number multiplied by 2 raised to the exponent of that number. In equation (2), the inverse function for the exponent is the logarithm in base two of the quotient of the FP divided by the mantissa, and the mantissa is bounded by 1.0 and 1.999 in order to cover the range of one least significant bit (LSB) change in the exponent. Equation (2) can also be expressed in the form of equation (3) and equation (4). Thus, it is clear, as shown in equation (4), that the logarithmic representation is the base two of a floating point number can be expressed as the exponent plus the logarithmic value of the mantissa.

Because the mantissa is always bounded between the values of 1.0 and 1.999, the value of 1, the integer part of the mantissa, need not be represented in the FP format. Therefore, the value of 1 is treated as an implied constant and does not appear in the bit field of the FP representation of a number. This treatment of the mantissa representation conserves space and improves the efficiency of ALU units.

Furthermore, since the FP mantissa is always represented in the range of 0.0 to 0.999, it is observed that the mantissa closely approximates the LN fraction, which also spans the range of 0.0 to 0.999. The accuracy of this approximation is indicated in Table A.

TABLE A

| 1+mant | log2(1+mant) | Error | |
|--------|--------------|-------|---|
| 1.0000 | 0.0000 | 0.0000 | |
| 1.1000 | 0.1375 | 0.0375 | |
| 1.2000 | 0.2630 | 0.0630 | |
| 1.3000 | 0.3785 | 0.0785 | |
| 1.4000 | 0.4854 | 0.0854 | |
| 1.5000 | 0.5850 | 0.0850 | <- max error occurs approximately here |
| 1.6000 | 0.6781 | 0.0781 | |
| 1.7000 | 0.7655 | 0.0655 | |
| 1.8000 | 0.8480 | 0.0480 | |
| 1.9000 | 0.9260 | 0.0260 | |
| 1.9999 | 0.9999 | 0.0000 | |

The maximum error is 0.0850 out of 1.000, or accurate to the 3–4th fractional binary bit. Or, if the error is considered to be bi-sectable (all errors are symmetric and positive), the 4th bit can be considered solidly accurate as a logarithm. Furthermore, the accuracy of this 'quick logarithm' can be quickly and efficiently improved using error correction techniques as disclosed in U.S. Pat. No. 5,365,465. However, according to the present invention, the "quick logarithm" is sufficiently accurate without correction for use in certain types of processing.

Consider that for most 'natural' signals like audio and video that the first derivative with respect to time (or spatially as in video) can have a significant amount of error and still be perceived as accurate due to the masking properties of the eyes and ears. The result is that for listening tests employing the present invention, a signal with NO MANTISSA sounded as good as toll 'phone' line quality and a signal with one mantissa bit sounded about as good as broadcast quality. A signal with two mantissa bits was not perceptively different from a signal reproduced from a sixteen bit data samples.

With the addition of an error term, calculated for each sample, even the course representation of one mantissa bit offered impressive quality signals. The error term which was introduced was created by locally decompressing the LDC data stream (integrating) and subtracting from the input.

A slew rate limited version of the LDC format was also tried with limited success by limiting the slew rate to only three exponent bits. In this case, differences where clearly audible under extreme dynamic signal conditions. Therefore, at least four exponent bits are used in the preferred embodiment.

Figure 5A:
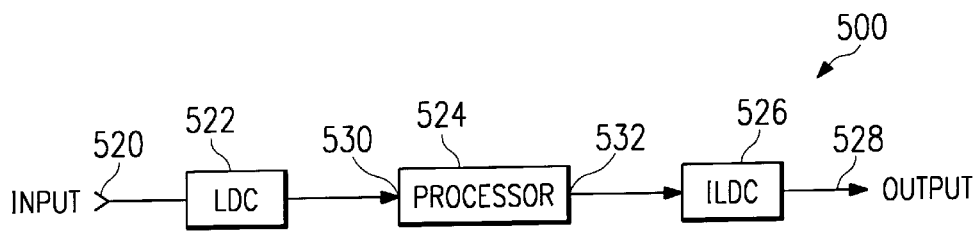
FIGS. 5A–5F are block diagrams of processing systems constructed according to the present invention.

An embodiment of the present invention is illustrated in FIG. 5A. An analog signal is applied to input 520 which provides the signal to a Logarithmic Differential Compression (LDC) block 522. LDC block 522 converts the signal from analog to digital using well known A/D techniques. An aspect of the present invention is that the A/D can be constructed so that the first derivative of the analog signal is formed prior to being converted to a digital representation, as shown in FIG. 5C. A logarithmic representation of the differential analog signal, referred to as an LDC data stream, is formed by the A/D circuitry. By proper selection of the scaling resistors within an A/D flash converter, a logarithmic value can be directly formed. The LDC data stream is then sent to via input 530 to processor 524, which will be described in more detail with reference to FIG. 6.

Figure 5B:
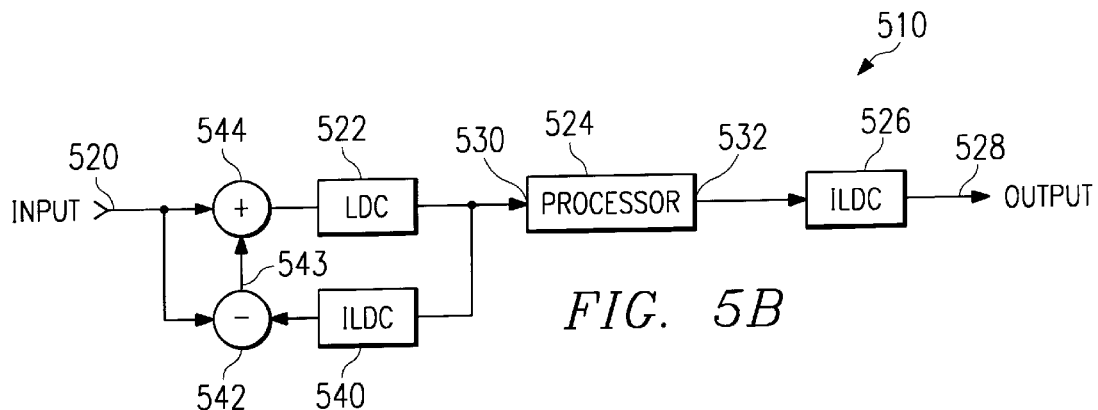
Figure 5C:
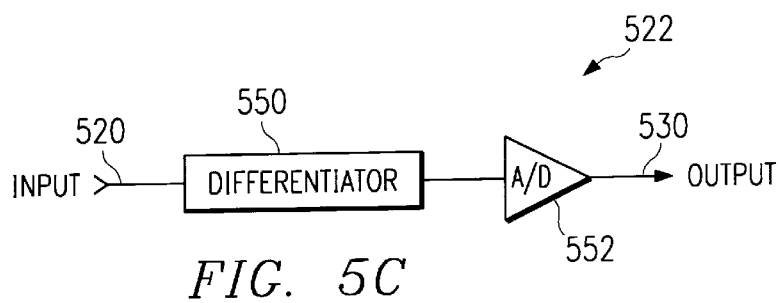

A processed LDC data stream is formed on output 532 and connected to Inverse Logarithmic Differential Compression (ILDC) block 526, which decompresses the processed LDC data stream by integration. The integrated logarithmic data stream is then converted to analog using standard digital to analog conversion (DAC) techniques with a suitably weighted DAC to form an anti-log of the integrated logarithmic data stream, as shown in FIG. 5E. ILDC block 526 may also filter the decompressed signal by means of a scaling factor of approximately 0.999, for example, in order to produce convergence. Convergence compensates for DC shifts and for interruptions in an incoming analog signal on input 520.

Figure 5D:
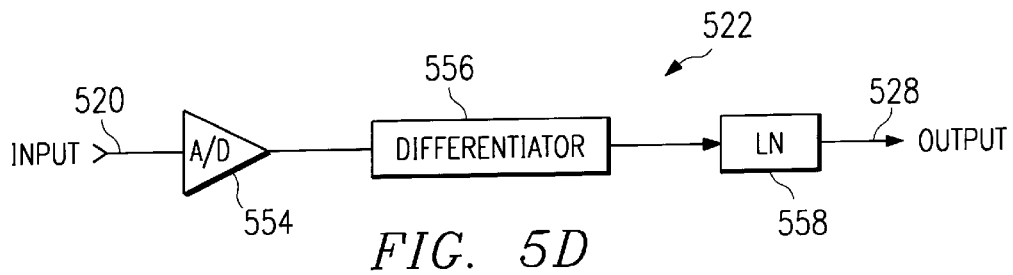
Figure 5E:
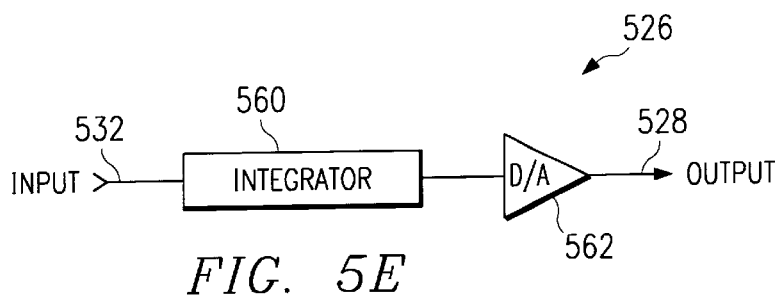

Another embodiment of LDC block 522 shown in FIG. 5D has a scalar A/D to form a stream of 16 bit scalar samples, for example, of an input signal. This scalar stream is then differentiated by subtraction, for example, and converted to an LDC data stream by a table look-up, for example.

Figure 5F:
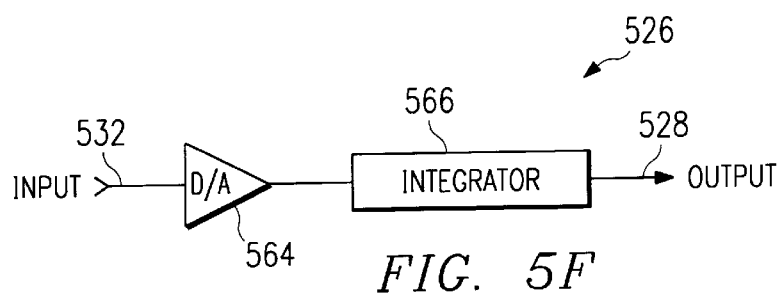

Another embodiment of ILDC block 526 shown in FIG. 5F converts the LDC samples to analog using a scalar A/D which also converts the samples to an anti-log form, and then an op-amp with suitable scaling can perform an integration to form an output signal on terminal 528.

Another embodiment of the present invention is illustrated in FIG. 5B. ILDC block 540 decompresses the LDC data stream produced by LDC block 522 and a decompressed signal is subtracted from the input signal on input 520 by subtractor 542 to produce an error value on output 543. The error value is then added to the signal on input 520 by adder 544 to form a compensated input signal which is provided to LDC block 522. This error correction circuitry may be used to compensate for using a mantissa of zero or one bits, for example.

Figure 6:
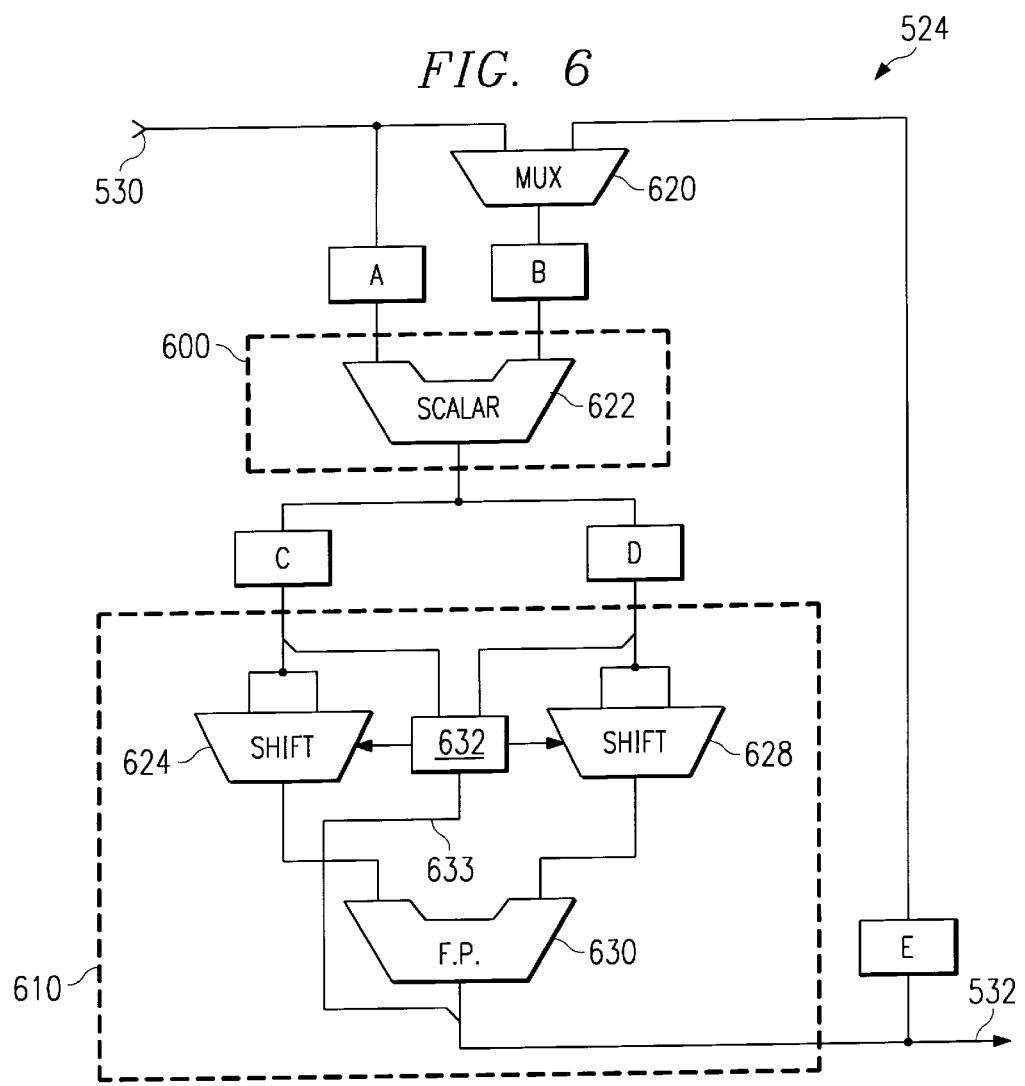
FIG. 6 is a block diagram of a processor for the systems of FIGS. 5A–5B.

FIG. 6 is a block diagram of processor 524. Registers A and B hold LDC data samples which can be multiplied by multiplier 600. Multiplier 600 performs multiplication in a logarithmic manner by simply adding the LDC samples in register A and register B in a scalar adder 622. Adder 622 may be a simple six bit scalar adder if the LDC format of FIG. 2b is used, or an eight bit scalar adder if the LDC format of FIG. 2C is used. A product from multiplier 600 may be stored in register C or register D. Multiplier 600 also performs division of LDC samples in registers A and B by scalar subtraction.

Floating Point (FP) adder 610 performs addition by treating the LDC data in registers C and D as floating point values and therefore adder 610 performs floating point addition and subtraction. According to the present invention, this treatment of the LDC samples in registers C and D as floating point representations requires NO conversion of the data samples. FP Adder 610 has shifter 624 and shifter 628 which align the mantissa of the LDC samples from register C and register D, respectively, as needed according to the relative value of the exponent of each data sample. FP control 632 compares the exponent values and directs either shifter 624 or 628 to shift in order to align the mantissas of the two samples, as is commonly done for floating point addition. Since, according to the present invention, the mantissa of the floating point representation may be four bits or less, shifters 624 and 628 need only be able to shift three bits. Adder 630 then adds the correctly aligned mantissa values to produce a sum. Again, according to the present invention, adder 630 may be a four bit adder, or less. An exponent value is provided by control 632 on output 633 and combined with the mantissa sum output by adder 630 to form an LDC sum output which may be provided on output 532 or saved in register E and further processed via mux 620. An advantage of the present invention is that the entire processor 524 may be implemented with a very small number of transistors, which may be less than 1,000 transistors.

Figure 7:
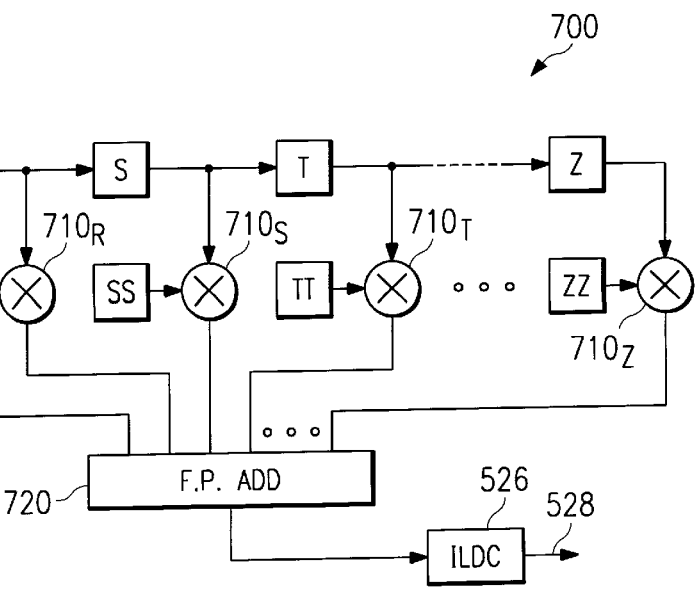
FIG. 7 is a block diagram of a FIR filter which processes a signal in accordance with the present invention.

FIG. 7 is a block diagram of a Finite Impulse Response (FIR) filter which processes a signal in accordance with the present invention. An LDC data stream is formed in LDC block 522, as described above. Filter stage registers R–Z form stages of the filter, as is commonly understood for FIR filters, but according to the present invention, LDC data samples are stored in each register. Coefficient registers QQ–ZZ hold coefficients in LDC format. Multipliers 710q–710z which form the filter tap partial products are simple scalar adders, as in multiplier 600 of FIG. 6. Floating Point adder 720 is constructed according to the FP adder 610, but has multiple inputs, one for each filter stage. According to the present invention, adder 720 may be a four bit adder, or less. If some applications in which a zero bit mantissa is acceptable, adder 720 only needs to determine the value of the largest exponent of all of the filter tap partial products. ILDC block 526 decompresses the LDC processed data stream from FP adder 720 and provides a filtered signal on output 528.

Figure 8A:
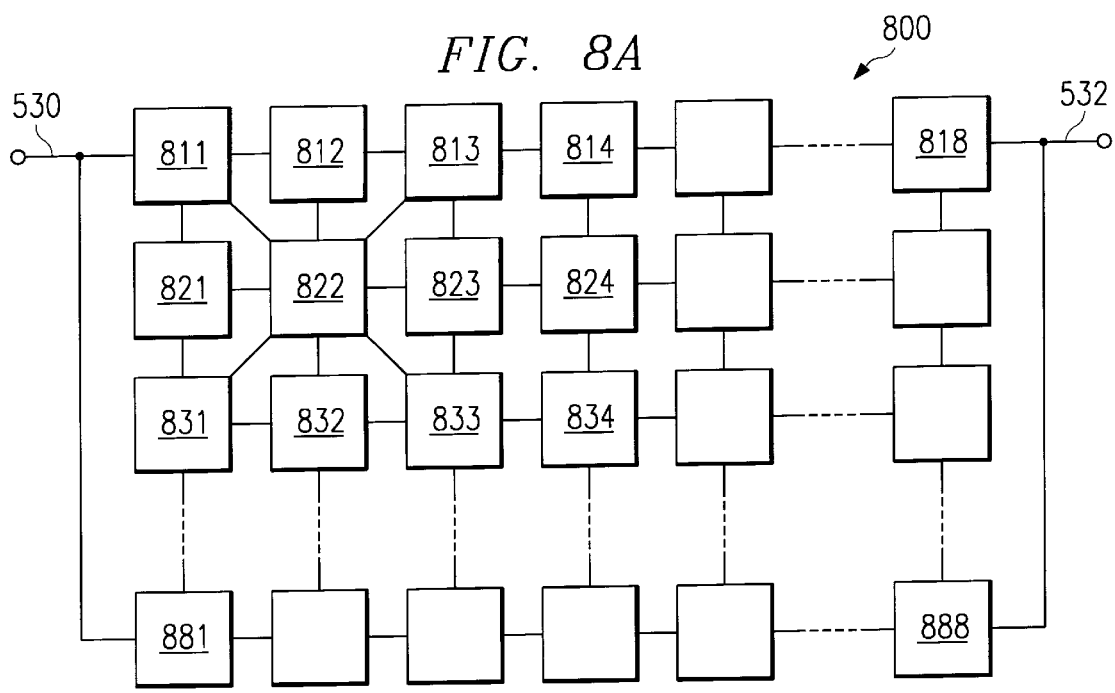
FIGS. 8A–8B are block diagrams of a matrix of processors for processing a signal in accordance with the present invention.
Figure 8B:
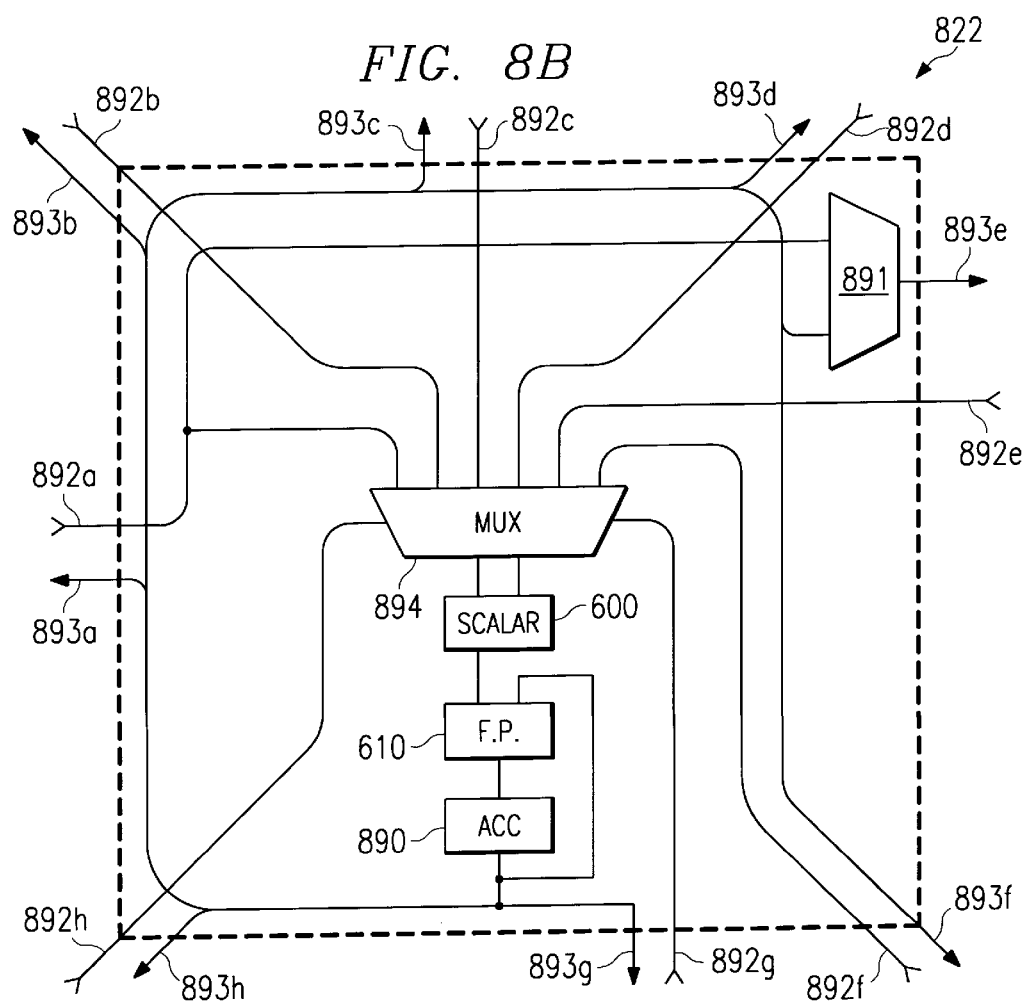

FIGS. 8A–8B are block diagrams of a matrix of processors for processing a signal in accordance with the present invention. Matrix Processor 800 may be used in a system as illustrated in FIGS. 5A–B by replacing processor 524 with matrix processor 800. A matrix is useful for various types of transformations, such as Discrete Cosine Transforms (DCT), Fast Fourier Transforms (FFT), and for various types of digital filtering, such as FIR and Infinite Impulse Response (IIR) filters. FIG. 8A shows an 8×8 array, although any size of array may be considered. Each processor element 811–888 is a processor with connection to other array elements. Full connectivity with all eight adjacent processors may be provided, as illustrated by processor 822, or NSEW connectivity, as illustrated by processor 824.

FIG. 8B shows a typical processor element 822 in more detail. LDC data streams are transferred into processor element 822 via inputs 892a–h and a processed LDC data stream are provided on outputs 893a–h. MUX 894 selects two LDC data samples to present to multiplier 600, which is similar to multiplier 600 of FIG. 6. FP adder 610 is likewise similar to FIG. 6. Accumulator 890 stores a processed LDC data sample and is connected to outputs 893a–h. As discussed above, each processor element may be constructed according to the present invention with less than approximately 1,000 transistors. Thus, the entire 8×8 matrix may require less than 64,000 transistors, which is less than a typical 32-bit scalar multiplier which is used in many common digital signal processing systems. Larger arrays may be constructed, such that each processing element operates on one pixel of a video scene, for example.

An advantage of the present invention is that the bit width of a processor or an array of processors may be optimized for a specific application by selecting an LDC format which is appropriate for that application. For example, as discussed earlier, for some applications an LDC format with four exponent bits and one mantissa bit is acceptable. A processor optimized for this LDC format would only need a six bit data path. A floating point adder for a one bit mantissa is extremely simple.

The present invention has advantageous uses in software based implementations, also. As discussed above, at least a 2× compression can be obtained which reduces storage requirements for LDC data streams. Thus, storage requirements for an audio or video signal on tape, compact disk, VCR, etc. can be advantageously reduced using logarithmic differential compression. LDC can be easily performed in software by using the equation Z[n]=x[n]−x[n−1] to differentiate a digital data stream and form an intermediate differential digital sample in scalar form, and then using a table look up to determine a logarithmic value having a format as illustrated in FIGS. 2B or 2C. Alternatively, the differential sample can be converted directly to a floating point sample by known techniques. According to the present invention, only a few bits of the floating point sample need be saved, such as four exponent bits and three mantissa bits, for example, and the truncated floating bit sample can also be used directly as a logarithmic representation of the differential sample.

The present invention also has advantageous uses in transmission systems in that an LDC data stream can be used to reduce the bandwidth required to transmit a signal, or to increase the bandwidth transmissible in a particular transmission medium without introducing noticeable artifacts.

According to the present invention, LDC data formats with up to four mantissa bits may be treated interchangeably as a logarithmic representation and a floating point representation without any correction. However, the size of the mantissa and/or the exponent may be increased to provide a greater accuracy for signals which require greater accuracy. For example, a data format with nine to sixteen bits could have a sign bit, an exponent in the range of one to nine bits, and a mantissa in the range of five to eight bits. Taking the first derivative of a signal prior to forming a logarithm using such a more accurate format still advantageously results in a compression of the storage space required to store such a signal or the bandwidth needed to transmit such a signal, as compared to a non-compressed digital representation of the original signal having the same accuracy.

An advantage of the present invention is that the benefits involved in treating a data representation as both a floating point representation and also a logarithmic representation without any correction may be applied directly to some types of signals without first taking the derivative of the signal. As discussed above, a mantissa of four bits provides a data representation which has a maximum error of approximately 8.5%. Thus, any system which can tolerate an error of up to approximately 8.5% can make use of this aspect of the present invention.

Another advantage of the present invention is that the LDC data stream may be further compressed by various known techniques of compression such as run length encoding, Huffman, LZW, etc. Furthermore, often the sign bit and upper bits of the exponent tend not to change frequently. Thus, by re-ordering the bits of an LDC data stream, such as by striping off the most significant bits into a separate group, the compression effect of these various known compression techniques may be even further enhanced.

Another advantage of the present invention is that control systems; such as for robots, disk controllers, machine tools, etc.; may use an LDC data format for control feedback loops in order to minimize the amount of circuitry required to realize a given control function. This is due to the fact the many control functions, like the human eyes and ears, can tolerate a reasonable amount of error and require a wide dynamic range. For example, when moving a disk arm, for example, a large portion of the movement will be at full speed. As the target position is approached, a feedback error signal is produced which controls the final positioning. By taking a first derivative of this signal and forming an LDC data stream, the process advantages of the present invention can be utilized to optimize the control circuitry.

Systems which utilize "fuzzy logic" can benefit from the advantages of the present invention since, by definition, fuzzy logic system can tolerate at least small amounts of error.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for processing an input signal, comprising the steps of:

converting said input signal to a numerical representation in floating point format having a mantissa and an exponent;

treating said numerical representation as a floating point operand to perform a floating point addition; and treating said numerical representations as a logarithm and using said numerical representation as a logarithmic operand to perform a logarithmic multiplication by scalar addition.

2. The method of claim 1, further comprising converting said numerical representation to an output signal in scalar format.

3. The method of claim 2, further wherein:

the step of converting said input signal comprises taking the first derivative of said input signal and converting said first derivative to a digital data stream; and the step of converting said numerical representation to form said output signal further comprises integrating said numerical representation.

4. The method of claim 1, wherein said input signal is a video signal and wherein said output signal is a video output signal.

5. A method for processing analog signals, comprising the steps of:

sampling an analog input signal in a periodic manner;

converting each sampled analog input signal to a logarithmic digital value to form a plurality of digital input samples in a floating point representation having a mantissa and an exponent;

processing said plurality of logarithmic digital input samples in a predetermined signal processing sequence including a floating point addition and a logarithmic multiplication by scalar addition of said logarithmic digital input samples;

converting a plurality of processed digital samples to a plurality of output analog samples; and filtering said plurality of output analog samples to form an output analog signal.

6. The method of claim 5, wherein the step of converting each sampled analog input to a logarithmic digital value comprises compressing said digital values by forming a difference value between two sequential analog input samples in a floating point representation.

7. The method of claim 6, further comprising:

decompressing said plurality of digital input samples by integration to form a decompressed input signal;

forming an error signal by subtracting said decompressed input signal from said input signal; and forming a compensated input signal by adding said error signal to said input signal.

8. The method of claim 6, wherein the step of converting said plurality of processed digital samples treats each of said processed digital samples as a difference value between two sequential analog output samples.

9. The method of claim 5, wherein the step of converting each sampled analog input signal to a digital value comprises forming a floating point format data sample having a predetermined number of bits in the range of 5–8 bits, said data sample further comprising:

a sign bit;

said exponent having at least one bit and as many as four bits; and said mantissa having at as few as zero bits and as many as four bits.

10. The method of claim 5, wherein the step of converting each sampled analog input signal to digital value comprises forming a floating point format data sample having a predetermined number of bits in the range of 9–16 bits, said data sample further comprising:

a sign bit;

said exponent having at least one bit and as many as eight bits; and said mantissa having at least one bit and as many as eight bits.

11. The method of claim 5, wherein the step of converting each sampled analog input signal to a logarithmic digital value comprises:

forming an intermediate digital input sample in a scalar representation; and converting said intermediate digital input sample to said logarithmic digital input sample in floating point representation.

12. The method of claim 5, wherein said analog input signal is an audio signal.

13. The method of claim 5, wherein said analog input signal is a video signal.

14. A digital processing circuit comprising:

circuitry for sampling an analog input signal to form a sequence of logarithmic digital samples in a floating point representation having a mantissa and an exponent;

a scalar adder for logarithmic multiplication of said logarithmic digital samples;

a floating point adder for adding said logarithmic digital samples, whereby said logarithmic digital samples are treated interchangeably as floating point digital samples; and circuitry for forming an output signal connected to said scalar adder and said floating point adder.

15. The digital processing circuit of claim 14, wherein the circuitry for sampling an analog input signal comprises:

a differentiator for forming a difference value between two sequential analog input samples; and a converter for converting said difference value to said logarithmic digital sample.

16. The digital processing circuit of claim 14, wherein the floating bit adder comprises:

circuitry for manipulation of one sign bit;

circuitry for manipulation of said exponent having one to three bits; and circuitry for manipulation of said mantissa having zero to four bits.

17. A digital processing system comprising:

circuitry for sampling an analog input signal to form a sequence of logarithmic digital samples in a floating point representation having an exponent and a mantissa;

an array of interconnected digital processing circuits wherein each of said digital processing circuits comprises:

a scalar adder for logarithmic multiplication of certain of said logarithmic digital samples;

a floating point adder for adding certain of said logarithmic digital samples, whereby said logarithmic digital samples are treated interchangeably as floating point digital samples; and circuitry for forming an output signal connected to said scalar adder and said floating point adder.

18. The digital processing system of claim 17, wherein the circuitry for sampling an analog input signal comprises:

a differentiator for forming a difference value between two sequential analog input samples; and a converter for converting said difference value to said logarithmic digital sample.

19. The digital processing system of claim 17, wherein said analog input signal is a video signal.

20. The digital processing system of claim 17, wherein said circuitry for sampling is a flash converter.

21. A digital processing system comprising:

circuitry for sampling an analog input signal to form a sequence of logarithmic digital samples in a floating point representation;

an array of interconnected digital processing circuits wherein each of said digital processing circuits comprise:

a scalar adder for logarithmic multiplication of certain of said logarithmic digital samples;

a floating point adder connected to said array of interconnected digital processing circuits for adding certain of said logarithmic digital samples; and circuitry for forming an output signal connected to said floating point adder.

22. The digital processing system of claim 21, wherein each digital processing circuit further comprises circuitry for holding a filter constant operand connected to said scalar adder.

* * * * *